United States Patent
Zhang et al.

(10) Patent No.: US 10,950,063 B2
(45) Date of Patent: Mar. 16, 2021

(54) METHOD AND DEVICE FOR IN-VEHICLE PAYMENT

(71) Applicant: Advanced New Technologies Co., Ltd., George Town (KY)

(72) Inventors: Hong Zhang, Hangzhou (CN); Zhongzheng Ye, Hangzhou (CN); Li Chen, Hangzhou (CN); Le Zhou, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/912,236

(22) Filed: Jun. 25, 2020

(65) Prior Publication Data

US 2020/0327742 A1 Oct. 15, 2020

Related U.S. Application Data

(63) Continuation of application No. 16/536,041, filed on Aug. 8, 2019, now Pat. No. 10,699,494, which is a (Continued)

(30) Foreign Application Priority Data

May 12, 2017 (CN) .......................... 201710333813.6

(51) Int. Cl.
*G07B 15/06* (2011.01)
*H04W 4/029* (2018.01)
(Continued)

(52) U.S. Cl.
CPC ....... *G07B 15/063* (2013.01); *G06K 9/00087* (2013.01); *G06K 9/00832* (2013.01); (Continued)

(58) Field of Classification Search
CPC ................................. G06Q 30/0207–30/0277
(Continued)

(56) References Cited

U.S. PATENT DOCUMENTS

| 10,699,494 B2 | 6/2020 | Zhang et al. |
| 2010/0030696 A1 | 2/2010 | Naccache |

(Continued)

FOREIGN PATENT DOCUMENTS

| CN | 101419726 | 4/2009 |
| CN | 105260757 | 1/2016 |

(Continued)

OTHER PUBLICATIONS

Alibaba demos facial recognition tech for online payments; planetbiometrics.com; Mar. 16, 2015 (Year: 2015).*

(Continued)

*Primary Examiner* — Luis A Brown
*Assistant Examiner* — Richard G Reinhardt
(74) *Attorney, Agent, or Firm* — Fish & Richardson P.C.

(57) ABSTRACT

The present disclosure provides a method and device for in-vehicle payment. A face image of an in-vehicle user and a geographic location of the in-vehicle user are received at a point of a ride route traveled by a vehicle occupied by the in-vehicle user. An image set associated with the geographic location is received from an image database using the geographic location of the in-vehicle user. The image set includes face images of a plurality of users. The face image of the in-vehicle user is compared with face images in the image set to determine an identity of the in-vehicle user. A fare deduction account corresponding to the in-vehicle user is identified using the identity of the in-vehicle user. A fare corresponding to the ride route is deducted from the fare deduction account.

20 Claims, 7 Drawing Sheets

Related U.S. Application Data continuation of application No. PCT/CN2018/086276, filed on May 10, 2018.

(51) Int. Cl.
  *G06K 9/00* (2006.01)
  *G06Q 20/32* (2012.01)
  *G06Q 20/40* (2012.01)
  *G06Q 30/02* (2012.01)

(52) U.S. Cl.
  CPC ... *G06Q 20/3224* (2013.01); *G06Q 20/40145* (2013.01); *G06Q 30/0266* (2013.01); *H04W 4/029* (2018.02)

(58) Field of Classification Search
  USPC .................................................. 705/319, 14
  See application file for complete search history.

(56) References Cited

U.S. PATENT DOCUMENTS

| | | |
|---|---|---|
| 2015/0088738 A1 | 3/2015 | Cateland et al. |
| 2015/0227923 A1* | 8/2015 | Kutsch ............... G06Q 20/401 705/67 |
| 2016/0012411 A1 | 1/2016 | Kursun et al. |
| 2016/0042357 A1 | 2/2016 | Ho |
| 2017/0116466 A1 | 4/2017 | Resnick et al. |
| 2017/0127230 A1* | 5/2017 | Enriquez ............... G08G 1/207 |
| 2018/0231979 A1 | 8/2018 | Miller et al. |
| 2018/0357668 A1 | 12/2018 | Kanemoto et al. |
| 2019/0362565 A1 | 11/2019 | Zhang et al. |

FOREIGN PATENT DOCUMENTS

| | | |
|---|---|---|
| CN | 105719133 | 6/2016 |
| CN | 106341461 | 1/2017 |
| JP | 11175782 | 7/1999 |
| JP | 2002049874 | 2/2002 |
| JP | 2013097094 | 5/2013 |
| JP | 2015184710 | 10/2015 |
| JP | 2016122922 | 7/2016 |
| JP | 2017063556 | 3/2017 |
| KR | 20120004654 | 6/2012 |
| TW | 201520968 | 6/2015 |
| TW | 201541393 | 11/2015 |
| TW | 201629868 | 8/2016 |
| WO | WO 2016155470 | 10/2016 |
| WO | WO 2017078080 | 11/2017 |

OTHER PUBLICATIONS

Alipay to Use Facial Recognition for mPayment Authentication; Alex Perala; mobileidworld.com; Mar. 16, 2015 (Year: 2015).*

* cited by examiner

METHOD AND DEVICE FOR IN-VEHICLE PAYMENT

CROSS-REFERENCE TO RELATED APPLICATIONS

This application claims is a continuation of and claims the benefit of priority of U.S. patent application Ser. No. 16/536,041, filed Aug. 8, 2019, which is a continuation of PCT Application No. PCT/CN2018/086276, filed on May 10, 2018, which claims priority to Chinese Patent Application No. 201710333813.6, filed on May 12, 2017, and each application is hereby incorporated by reference in its entirety.

TECHNICAL FIELD

The present disclosure relates to the field of network technologies, and in particular, to a method and device for in-vehicle payment.

BACKGROUND

With the rapid development of Internet technologies, the operation mode of the taxi industry is also changing. For example, when wanting to take a taxi, a user can use taxi hailing software to hail a taxi and make payment after getting off the taxi. The taxi hailing software provides great convenience for traveling. However, the user needs to bring a mobile phone or a wallet and install the taxi hailing software on the mobile phone for operations related to taxi hailing and payment. Otherwise, it is not convenient to hail a taxi.

SUMMARY

In view of this, the present disclosure provides a method and device for in-vehicle payment so that it is more convenient to pay during traveling by vehicle.

The present disclosure is implemented by using the following technical solutions.

According to a first aspect, a method for in-vehicle payment is provided, and the method includes the following: obtaining a face image of an in-vehicle user and a geographic location of the in-vehicle user at an endpoint of a ride route; obtaining an image set associated with the geographic location from an image database based on the geographic location, where the image set includes face images of a plurality of users; comparing the face image of the in-vehicle user with each face image in the image set to recognize the in-vehicle user's identity and obtain a fare deduction account corresponding to the in-vehicle user; and deducting a fare of a present ride from the fare deduction account.

According to a second aspect, a system for in-vehicle payment is provided, and the system includes the following: a base disposed in a vehicle used by a user; and a smart terminal device supported by the base, where an application (app) for in-vehicle payment is installed on the smart terminal device, and the app for in-vehicle payment is used to perform the method for in-vehicle payment described in the present disclosure.

According to a third aspect, a device for in-vehicle payment is provided, and the device includes the following: a data acquisition module, configured to obtain a face image of an in-vehicle user and a geographic location of the in-vehicle user at an endpoint of a ride route; an image acquisition module, configured to obtain an image set associated with the geographic location from an image database based on the geographic location, where the image set includes face images of a plurality of users; an identity recognition module, configured to compare the face image of the in-vehicle user with each face image in the image set to recognize the in-vehicle user's identity and obtain a fare deduction account corresponding to the in-vehicle user; and a fare deduction module, configured to deduct a fare of a present ride from the fare deduction account.

According to the method and device for in-vehicle payment in the present disclosure, face recognition is performed on the in-vehicle user to obtain the user's identity and automatically deduct the fare. As such, it is more convenient to pay during traveling by vehicle. The fare can be deducted even if the user does not bring a mobile phone and a wallet.

DESCRIPTION OF IMPLEMENTATIONS

A method for in-vehicle payment provided in an example of the present disclosure can be applied, for example, to taxi fare payment.

Figure 1:
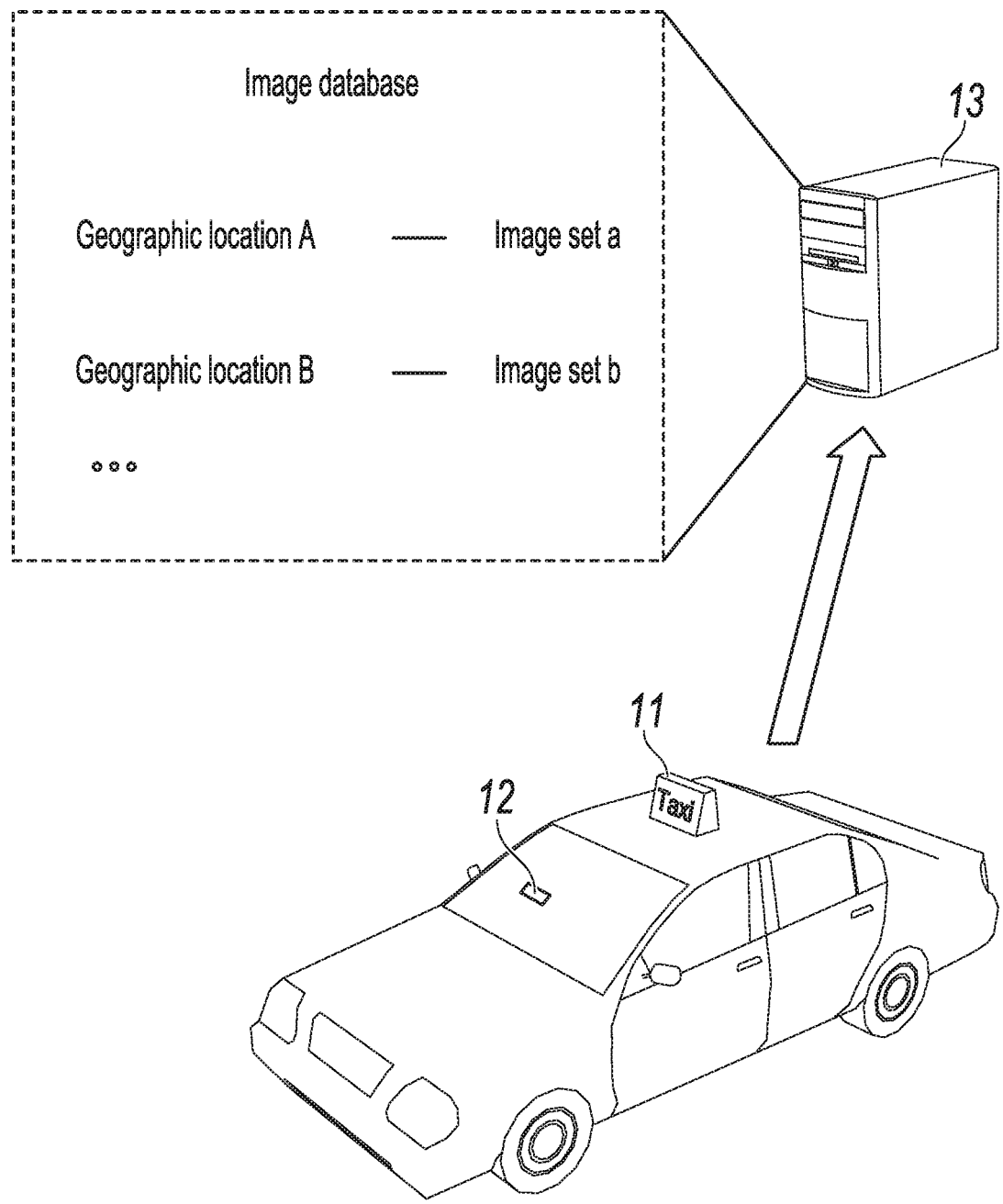
FIG. 1 is diagram illustrating an application scenario of in-vehicle payment, according to an implementation of the present disclosure.

A taxi is used as an example for description in the application scenario shown in FIG. 1. An image collection device 12 can be disposed in a taxi 11. The image collection device 12 has a camera. The camera can be used to collect a face image of an in-vehicle user who takes the taxi. The image collection device 12 can transmit the obtained face image to a server 13 at the back end. The server 13 performs processing based on the face image and automatically deducts the fare of the present ride of the in-vehicle user.

Figure 2:
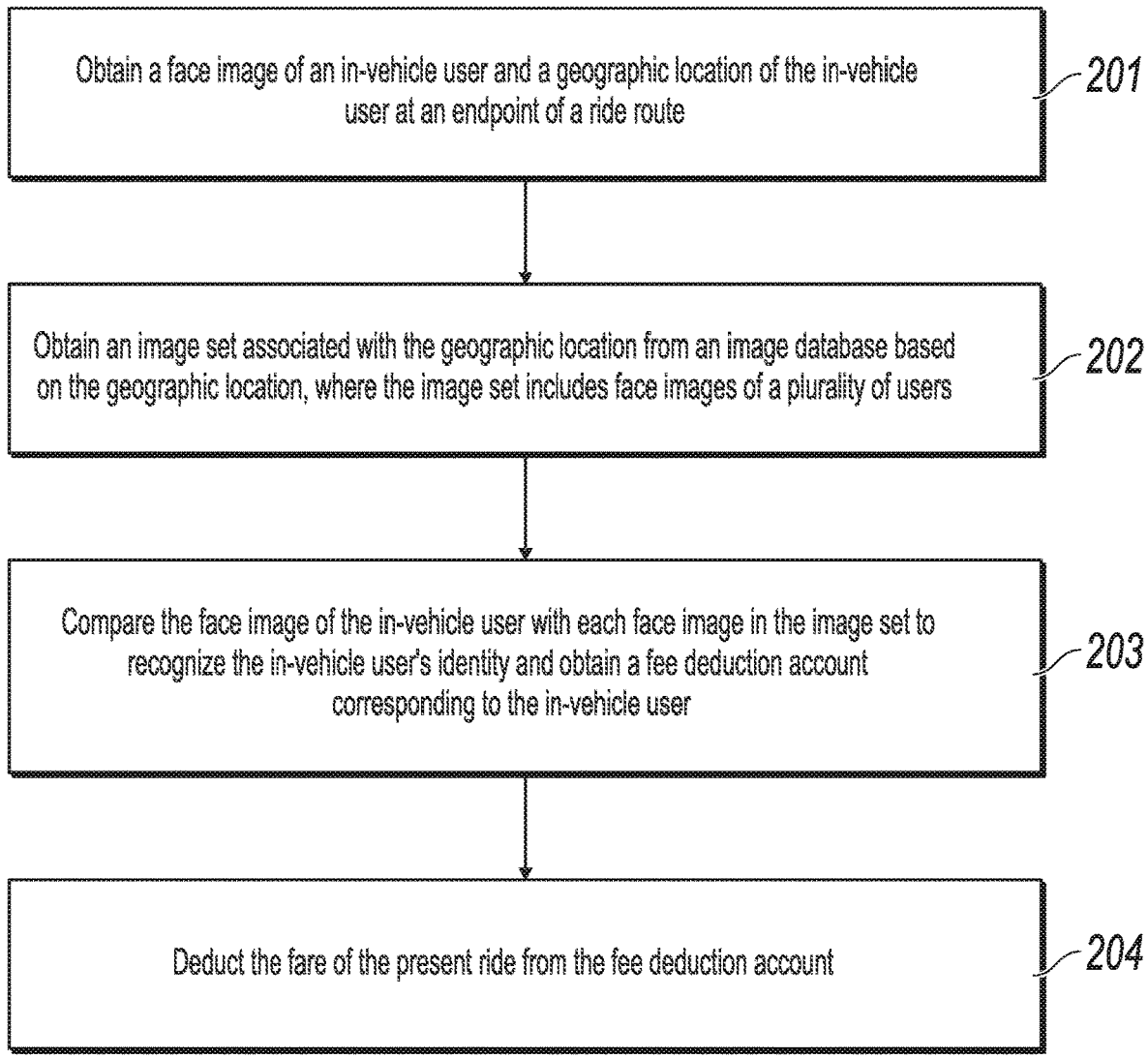
FIG. 2 is a flowchart illustrating in-vehicle payment, according to an implementation of the present disclosure.

FIG. 2 illustrates the flow of performing in-vehicle payment by the server 13 in an example.

Step 201: Obtain a face image of an in-vehicle user and a geographic location of the in-vehicle user at an endpoint of a ride route.

For example, the image collection device 12 in FIG. 1 can not only obtain the face image of the in-vehicle user, but also locate the in-vehicle user to obtain the geographic location of the in-vehicle user at the endpoint of the ride route. The endpoint of the ride route here can be the place where the user gets on the taxi or the place where the user gets off the taxi.

In addition, the geographic location obtained by the server 13 in the present step can be obtained by the image collection device 12 through positioning or collected by another device by using another method, provided that the server 13 can obtain the location.

Figure 3:
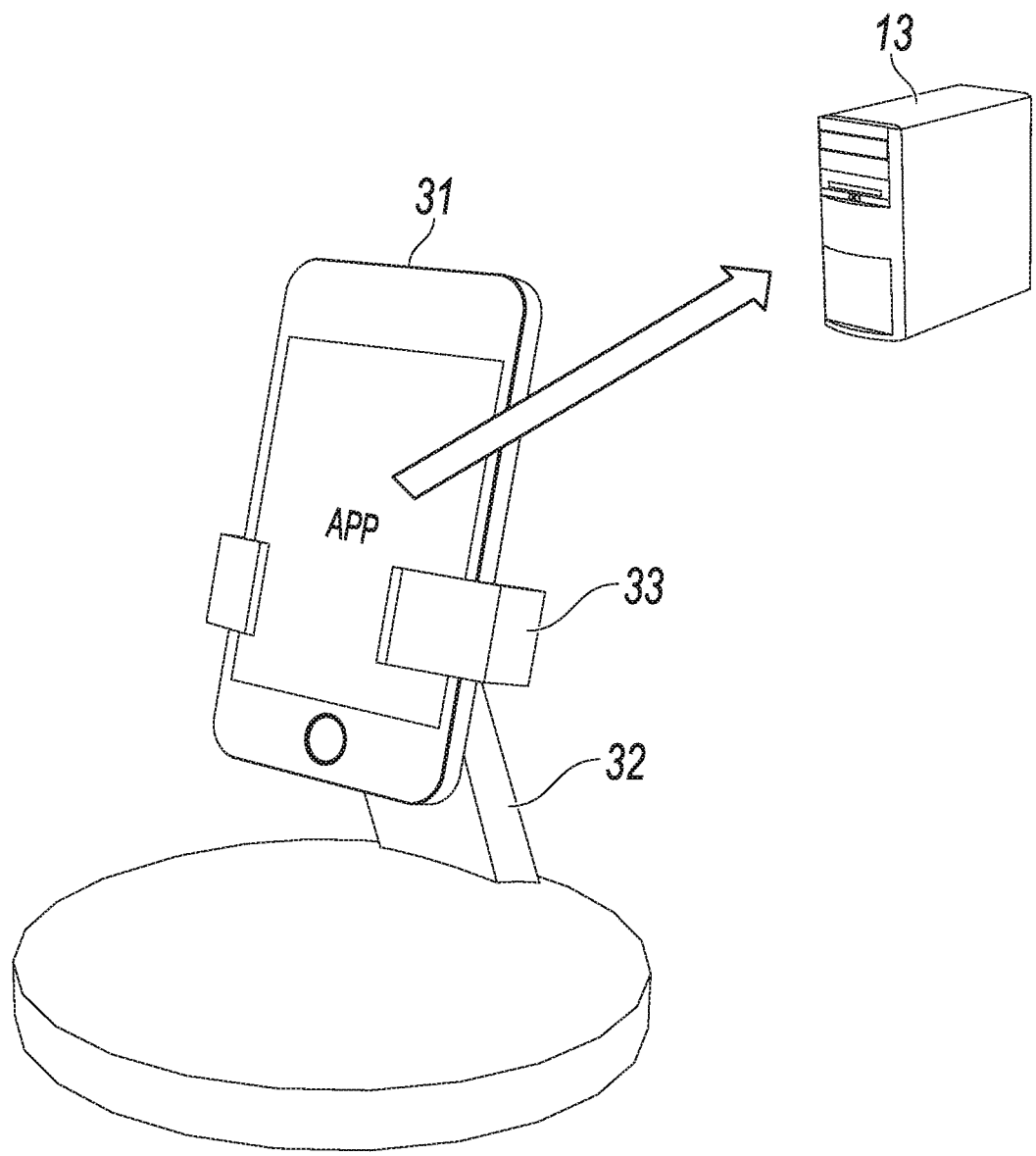
FIG. 3 is a schematic diagram illustrating a mobile phone disposing method, according to an implementation of the present disclosure.

In an example, the image collection device 12 can be a smart terminal device such as a smartphone. The smartphone can be provided by the driver of the taxi. The smartphone can be disposed to the passenger seat position in the taxi so that the face image of the user who takes the taxi can be collected in the position. FIG. 3 illustrates a mobile phone disposing method. A smartphone 31 can be supported by a base 32. The base 32 is disposed in a certain position in the taxi, for example, the shelf in front of the passenger seat. In the present example, the camera of the smartphone 31 can be used to collect the face image of the in-vehicle user.

As shown in FIG. 3, an application (app) for in-vehicle payment is installed on the smartphone 31. The app is equivalent to a client software of the app for in-vehicle payment. The client software can transmit the collected face image to the server 13 at the back end. In addition, in an example, the base 32 can include a multi-degree-of-freedom clip module 33. The multi-degree-of-freedom clip module 33 can flexibly rotate under the control of the app for in-vehicle payment so that the camera of the smartphone can collect the face image of the in-vehicle user. For example, when identifying that the camera does not directly face the user's face, the app can control the multi-degree-of-freedom clip module 33 to rotate so that the face image can be better collected. In another example, the multi-degree-of-freedom clip module 33 can also have 0 degrees of freedom and be secured to a position facing the user's face at a medium height.

The app client software in the present step can further collect the geographic location of the in-vehicle user at the endpoint of the ride route. For example, when the user gets off the taxi, the app can transmit the obtained geographic location to the server 13 at the back end. The server 13 can store the geographic location transmitted by the app in association with the user's face image. References can be made to the example shown in FIG. 1. Many people live a routine life from Monday to Friday and get on and off vehicles in relatively stable locations. Therefore, it is easy to collect statistics about the locations. However, because many people get on and off vehicles in the same location, a plurality of face images correspond to the same geographic location. "Geographic location A—image set a" illustrated in FIG. 1 indicates that a plurality of users get on and off vehicles in geographic location A. Image set a includes face images of the plurality of users. Similarly, "geographic location B—image set b" is another association relationship indicating that the users corresponding to the face images in image set b often get on and off vehicles in geographic location B.

Step 202: Obtain an image set associated with the geographic location from an image database based on the geographic location, where the image set includes face images of a plurality of users.

The image set can be obtained from a stored image database based on the geographic location of the in-vehicle user as determined in step 201. That is, the users corresponding to the face images in the image set often get on and off vehicles in the geographic location. In this case, the current in-vehicle user can be one of these users. The current in-vehicle user' identity can be recognized by using step 203.

Step 203: Compare the face image of the in-vehicle user with each face image in the image set to recognize the in-vehicle user's identity and obtain a fare deduction account corresponding to the in-vehicle user.

In the present step, the face recognition technology is used to recognize the face image of the current in-vehicle user from the image set obtained in step 202. The face images in the image database can be collected when in-vehicle users register with the app for in-vehicle payment in advance. In addition, the users can further associate their personal information such as fare deduction accounts, ages, names, and occupations with their face images during registration. In the present step, the face image of the current in-vehicle user can be recognized from the image set, that is, the user's identity is learned, and the corresponding fare deduction account is obtained, through face image comparison.

In an example, the geographic location of the in-vehicle user can be located in more detail to reduce the quantity of images in the image set during face image comparison in the present step and improve the comparison efficiency. For example, when obtaining the geographic location of the in-vehicle user in step 201, the server can not only receive the location sent by the APP, but also combine location information obtained by using another method. For example, there can be some network access points such as Bluetooth and Wi-Fi around the place where the in-vehicle user gets on and off the taxi. The user's smart terminal device can connect to these network access points. The user's smart terminal device or the network access points reports or report connection information to the server. Based on the locations of the network access points connected to the smart terminal device, the server assists the app in locating the user to determine the geographic location of the user when the user uses the taxi. The geographical location determined in this way is more detailed. The locations of the network access points can be in a predetermined range around the endpoint of the ride route, for example, in a range with a diameter of 200 meters around the place where the user gets on the taxi. The location in more detail reduces the quantity of images in the image set and improves the face recognition efficiency. Correspondingly, the face images in the image database can be stored in association with more detailed geographic locations. It is worthwhile to note that the smart terminal device of the in-vehicle user, for example, the user's mobile phone, belongs to the in-vehicle user. The in-vehicle smart terminal device in the present example, for example, the smartphone 31 supported by the base 32 in FIG. 3 does not belong to the in-vehicle user and can be a mobile phone provided by the driver. The two smart terminal devices are different.

Step 204: Deduct the fare of the present ride from the fare deduction account.

In the present step, the fare can be deducted from the user's fare deduction account. In addition, a password-free payment with a limit can be made because the taxi fare is not very high. In an example, a payment can be made by using a password if the user wants to authorize the fare deduction. In addition, some security measures can assist in the payment. For example, the voiceprint of the in-vehicle user can be collected during password-free payment. When the collected voiceprint is consistent with the voiceprint collected when the user registers in advance, it is confirmed that the in-vehicle user is the user of the fare deduction account, and the password-free payment with a limit is allowed.

According to the method and device for in-vehicle payment in the present example, face recognition is performed on the in-vehicle user to obtain the user's identity and automatically deduct the fare. As such, it is more convenient to pay during traveling by vehicle. The fare can be deducted even if the user does not bring a mobile phone and a wallet.

In another example, the application of the present disclosure in vehicles can be further enriched. For example, what shown in FIG. 3 can be referred to as a system for in-vehicle payment. The system can include a base 32 disposed in a vehicle taken by a user and a smart terminal device 31 supported by the base 32. A client software of an app for in-vehicle payment is installed on the smart terminal device 31. The app can perform the method for in-vehicle payment previously described in the present disclosure.

Figure 4:
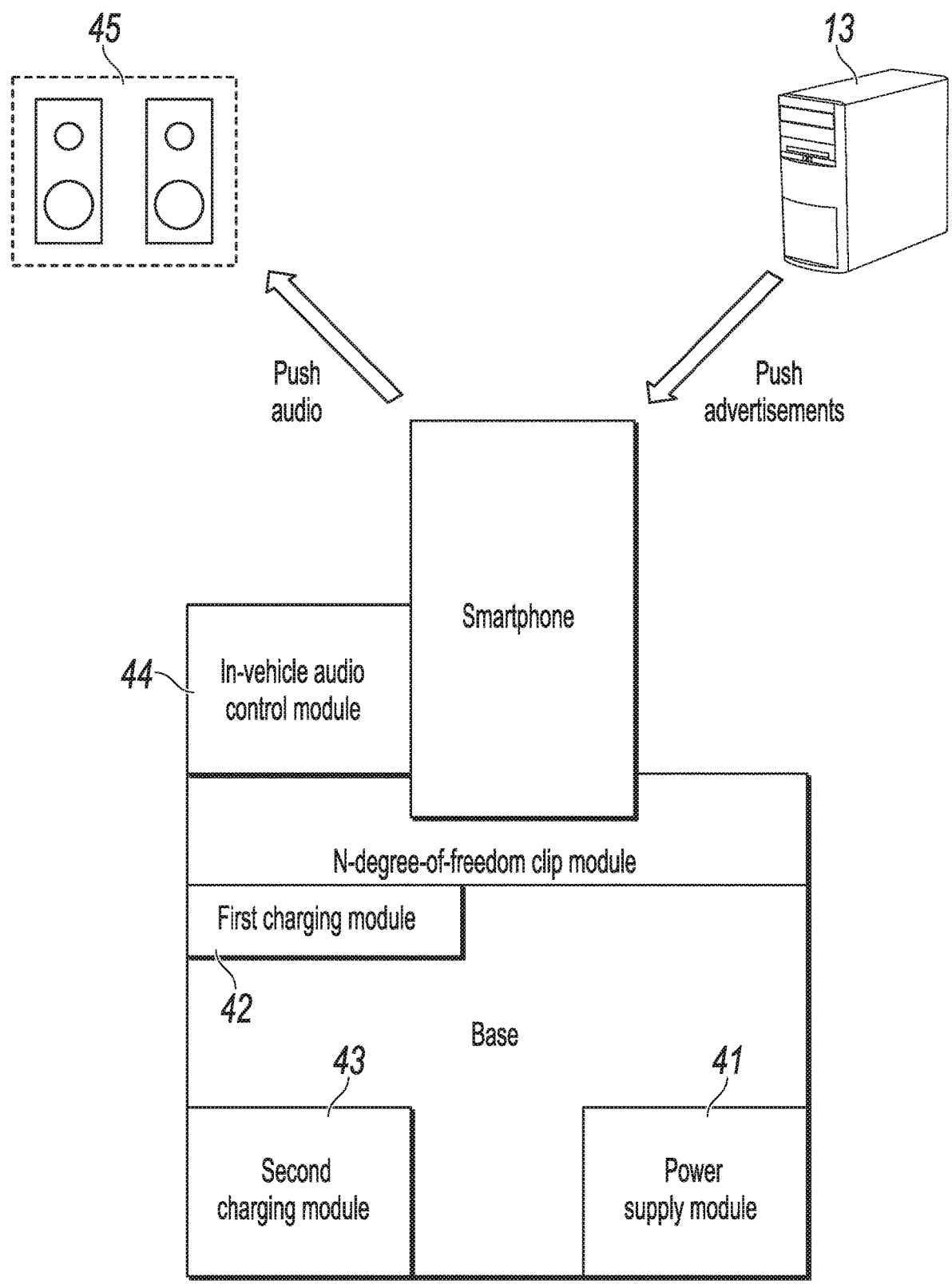
FIG. 4 is a schematic diagram illustrating a base structure, according to an implementation of the present disclosure.

For example, the base can be designed as shown in FIG. 4. The base can include the following modules: a power supply module 41, configured to extract 5 V direct-current power from a vehicle battery; a first charging module 42, connected to the power supply module 41 and configured to charge the smart terminal device on the base, where the smart terminal device can be a smartphone secured on an N-degree-of-freedom clip module; and a second charging module 43, connected to the power supply module 41 and configured to charge another smart terminal device, where the another smart terminal device can be, for example, the in-vehicle user's smartphone, and the second charging module 43 can include an insertion detection circuit that automatically starts charging when the user inserts a mobile phone. As such, the base can function as a charger, facilitating charging for the user who takes the taxi.

For another example, the smart terminal device can include an in-vehicle audio control module 44, configured to push audio of the app for in-vehicle payment on the smartphone to a vehicle audio device 45. After getting on the taxi, the user can order some music or videos on the smartphone. The smartphone can use the in-vehicle audio control module 44 to push the audio ordered by the user to the vehicle audio device 45 for playing. For example, the in-vehicle audio control module 44 can push the audio through FM transmission or Bluetooth to Aux IN. The design enables the user to order and control the content played by the vehicle audio device. Compared with the conventional method of controlling audio content by the driver, it provides better ride experience for the user.

For another example, the collected face image of the in-vehicle user can be fully utilized. As shown in FIG. 4, the server 13 at the back end can obtain a user attribute feature, such as the gender and age, of the in-vehicle user based on the face image, and push a corresponding advertisement to the app based on the attribute feature. For example, the server can push cosmetics and clothes advertisements for female passengers and health-related advertisements for elderly passengers. The advertisement pushing method allows more accurate advertisement pushes. In addition, the advertisements played by the app can be superimposed on the floating layer without affecting user entertainment.

As can be seen from the above, the system for in-vehicle payment in the present disclosure can be a system integrating payment and entertainment. The system can not only automatically complete fare payment by recognizing the face image, but also charge the in-vehicle user's mobile phone and accurately push advertisements to the in-vehicle user based on the recognized face image. In addition, the vehicle audio device can play the entertainment content ordered by the user. As such, the user can enjoy better ride experience.

Compared with the existing technology, on the one hand, the system changes the entertainment mode. There is no need to install a display screen behind the passenger seat, saving the cost and preventing hazards to rear-seat passengers. Passengers can select entertainment content that they are interested in, improving the interest of the passengers in taking taxies. On the other hand, the existing method of playing advertisements on the screen behind the passenger seat is not targeted, while according to the method in the present example, different advertisements can be pushed to different passengers based on collected face images to achieve a better advertising effect. In addition, the user does not need to perform complicated operations for payment. The server can collect the face image to recognize the user and perform automatic fare deduction.

An execution sequence of the steps in the procedure shown in FIG. 2 is not limited to the sequence in the flowchart. In addition, descriptions of steps can be implemented as a form of software, hardware, or a combination thereof. For example, a person skilled in the art can implement the descriptions in a form of software code, and the code can be a computer executable instruction that can implement logical functions corresponding to the steps. When implemented in a software form, the executable instruction can be stored in a memory and executed by a processor in a device.

Figure 5:
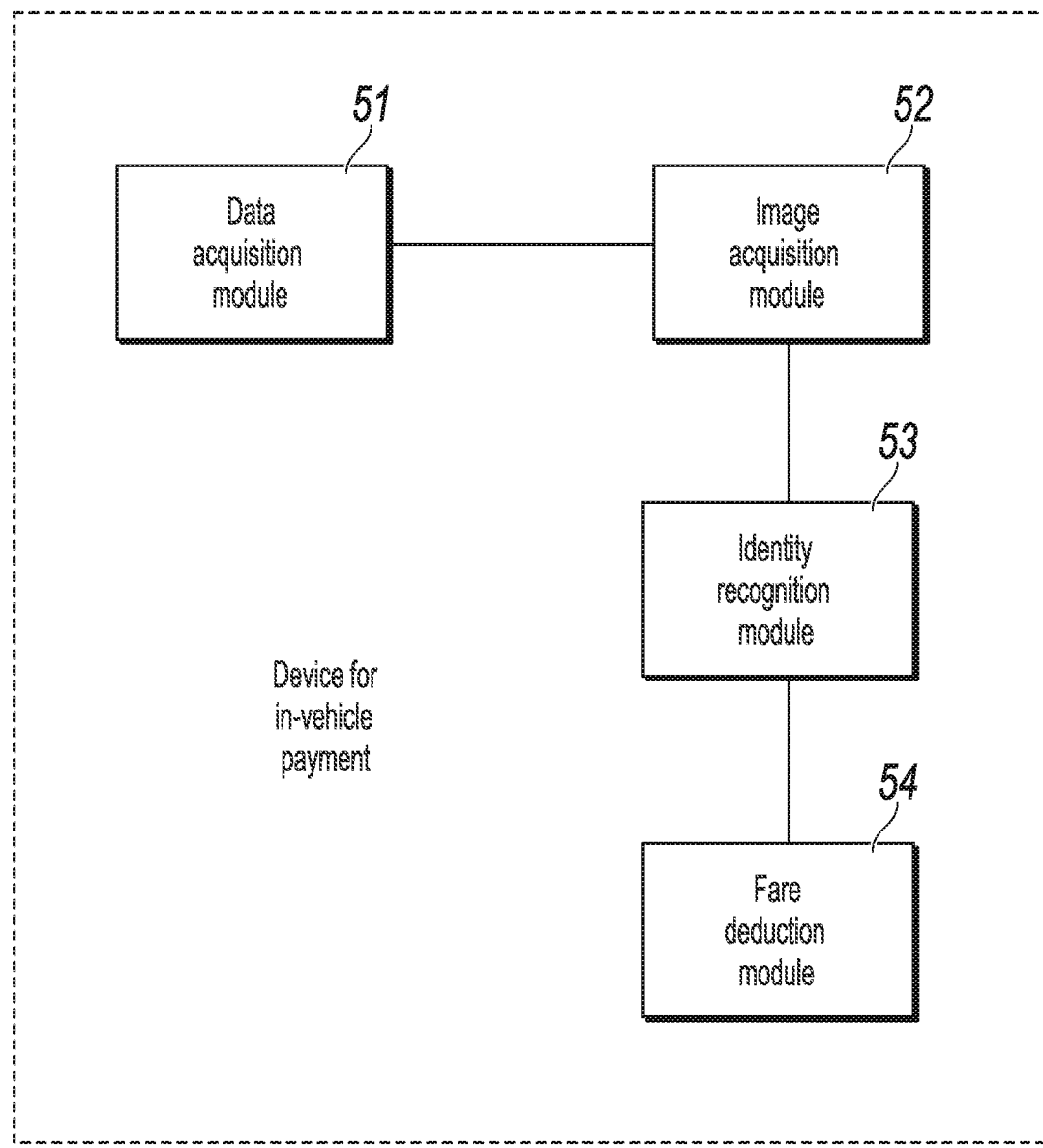
FIG. 5 is a schematic structural diagram illustrating a device for in-vehicle payment, according to an implementation of the present disclosure.

For example, the present disclosure simultaneously provides a device corresponding to the method. The device can include a processor and a memory. The processor and the memory usually connect to each other by using an internal bus. In another possible implementation, the device can further include an external interface so that the device can communicate with another device or component. Further, the memory stores control logic for in-vehicle payment. A computer instruction is stored on the memory and can run on the processor. The processor is configured to implement the control logic for in-vehicle payment by executing the instruction. Logical modules divided based on functions from the control logic can be in the structure shown in FIG. 5. As shown in FIG. 5, the device for in-vehicle payment can include a data acquisition module 51, an image acquisition module 52, an identity recognition module 53, and a fare deduction module 54.

The data acquisition module 51 is configured to obtain a face image of an in-vehicle user and a geographic location of the in-vehicle user at an endpoint of a ride route.

The image acquisition module 52 is configured to obtain an image set associated with the geographic location from an image database based on the geographic location, where the image set includes face images of a plurality of users.

The identity recognition module 53 is configured to compare the face image of the in-vehicle user with each face image in the image set to recognize the in-vehicle user's identity and obtain a fare deduction account corresponding to the in-vehicle user.

The fare deduction module 54 is configured to deduct the fare of the present ride from the fare deduction account.

In an example, the data acquisition module 51 is configured to obtain the geographic location of the in-vehicle user at the endpoint of the ride route, including obtaining a geographic location collected by an app client software when the in-vehicle user gets on the vehicle, where a smart terminal device that the app client software runs on is disposed inside the vehicle used by the in-vehicle user.

Figure 6:
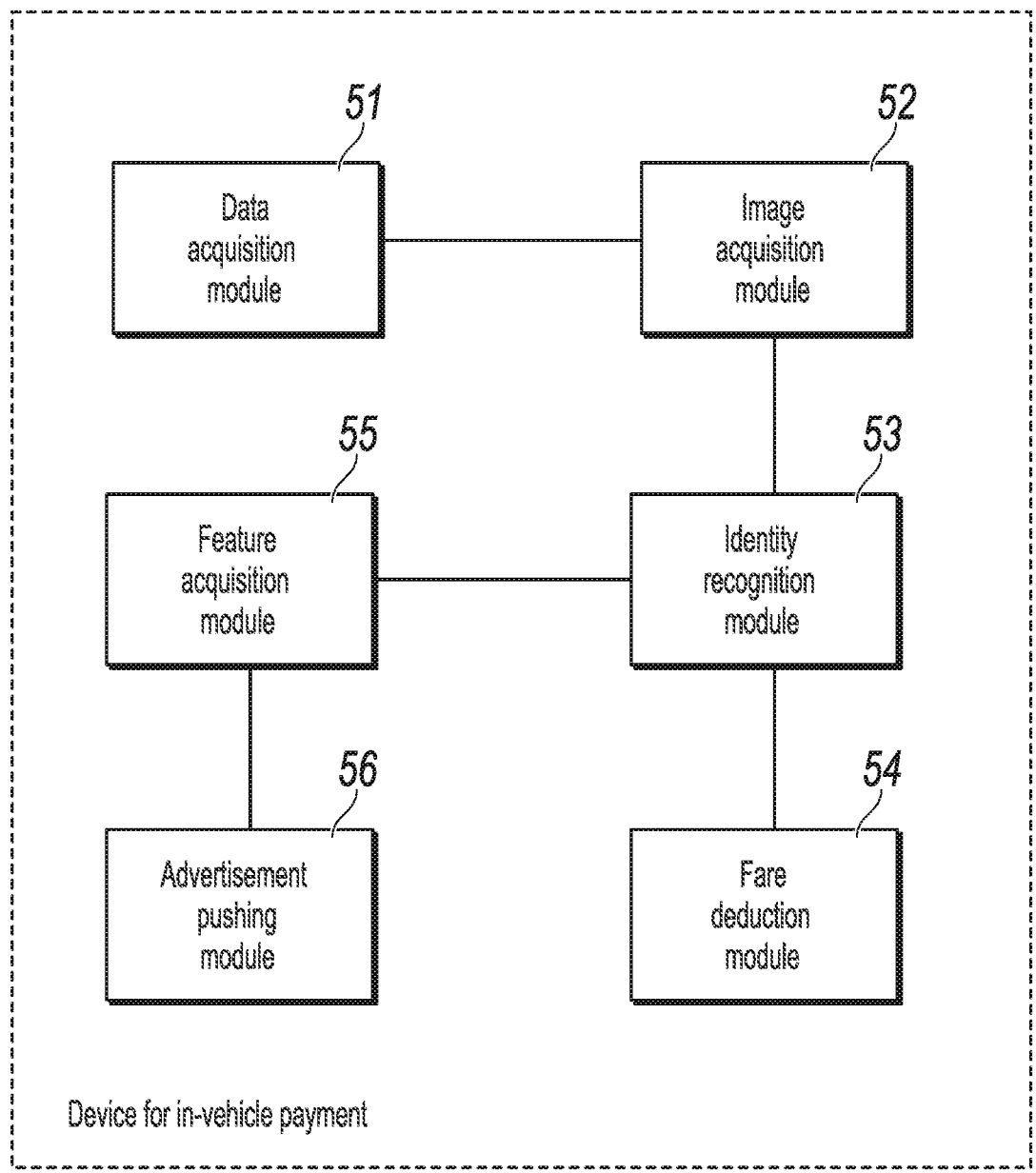
FIG. 6 is a schematic structural diagram illustrating a device for in-vehicle payment, according to an implementation of the present disclosure.

In an example, as shown in FIG. 6, the device can further include a feature acquisition module 55 and an advertisement pushing module 56.

The feature acquisition module 55 is configured to obtain a user attribute feature of the in-vehicle user based on the face image of the in-vehicle user.

The advertisement pushing module 56 is configured to push an advertisement corresponding to the user attribute feature to the app client software.

In an example, the data acquisition module 51 is configured to obtain the geographic location of the in-vehicle user at the endpoint of the ride route, including determining the geographic location of the in-vehicle user based on a location of a network access point connected to a smart terminal device of the in-vehicle user, where the location of the network access point is in a predetermined range around the endpoint of the ride route.

In addition, the password input procedure illustrated in FIG. 2 can be included in a computer readable storage medium. The medium stores a machine readable instruction corresponding to the control logic for in-vehicle payment. The medium can connect to a processing device that executes the instruction. The instruction stored on the medium can be executed by the processing device. The machine readable instruction that corresponds to the control logic for in-vehicle payment and is stored on the medium is used to perform the following operations: obtaining a face image of an in-vehicle user, and a geographic location of the in-vehicle user at an endpoint of a ride route; obtaining an image set associated with the geographic location from an image database based on the geographic location, where the image set includes face images of a plurality of users; comparing the face image of the in-vehicle user with each face image in the image set to recognize the in-vehicle user's identity and obtain a fare deduction account corresponding to the in-vehicle user; and deducting the fare of the present ride from the fare deduction account.

In the present disclosure, the computer readable storage medium can have a plurality of forms. For example, in different examples, the machine readable storage medium can be a random access memory (RAM), a volatile memory, a non-volatile memory, a flash memory, a storage drive (such as a hard disk drive), a solid-state drive, a storage disk of any type (such as an optical disc and a DVD), a similar storage medium, or a combination of these media. In a special case, the computer readable medium can be alternatively paper or another suitable medium that can be used to print a program. Using these media, the programs can be obtained electronically (for example, optically scanned), compiled, interpreted, and processed in a suitable way, and then stored in a computer medium.

The devices or modules described in the previous implementations can be implemented by a computer chip or an entity, or can be implemented by a product with a certain function. A typical implementation device is a computer, and the computer can be a personal computer, a laptop computer, a cellular phone, a camera phone, an intelligent phone, a personal digital assistant, a media player, a navigation device, an email receiving and sending device, a game console, a tablet computer, a wearable device, or any combination of these devices.

For ease of description, the previous device is described by dividing the functions into various modules. Certainly, when the present disclosure is implemented, the functions of each module can be implemented in one or more pieces of software and/or hardware.

In the implementations of the present application, biometric recognition can be used during fare deduction after the in-vehicle user's identity is determined, to ensure that the fare deduction is performed by the user of the fare deduction account and further enhance the security of the user's fund. For example, the biometric recognition can be used to trigger a confirmation from the user for the fare deduction. The biometrics involved in the biometric recognition can include eye features, voiceprints, fingerprints, palm prints, heartbeats, pulse, chromosome, DNA, bite marks, etc. The eye features can include iris, sclera, etc. For example, the user's voiceprint can be recognized, and the fare is deducted when the voiceprint matches the pre-registered voiceprint.

The previous descriptions are merely example implementations of the present disclosure, but are not intended to limit the present disclosure. Any modification, equivalent replacement, or improvement made without departing from the spirit and principle of the present disclosure should fall in the protection scope of the present disclosure.

Figure 7:
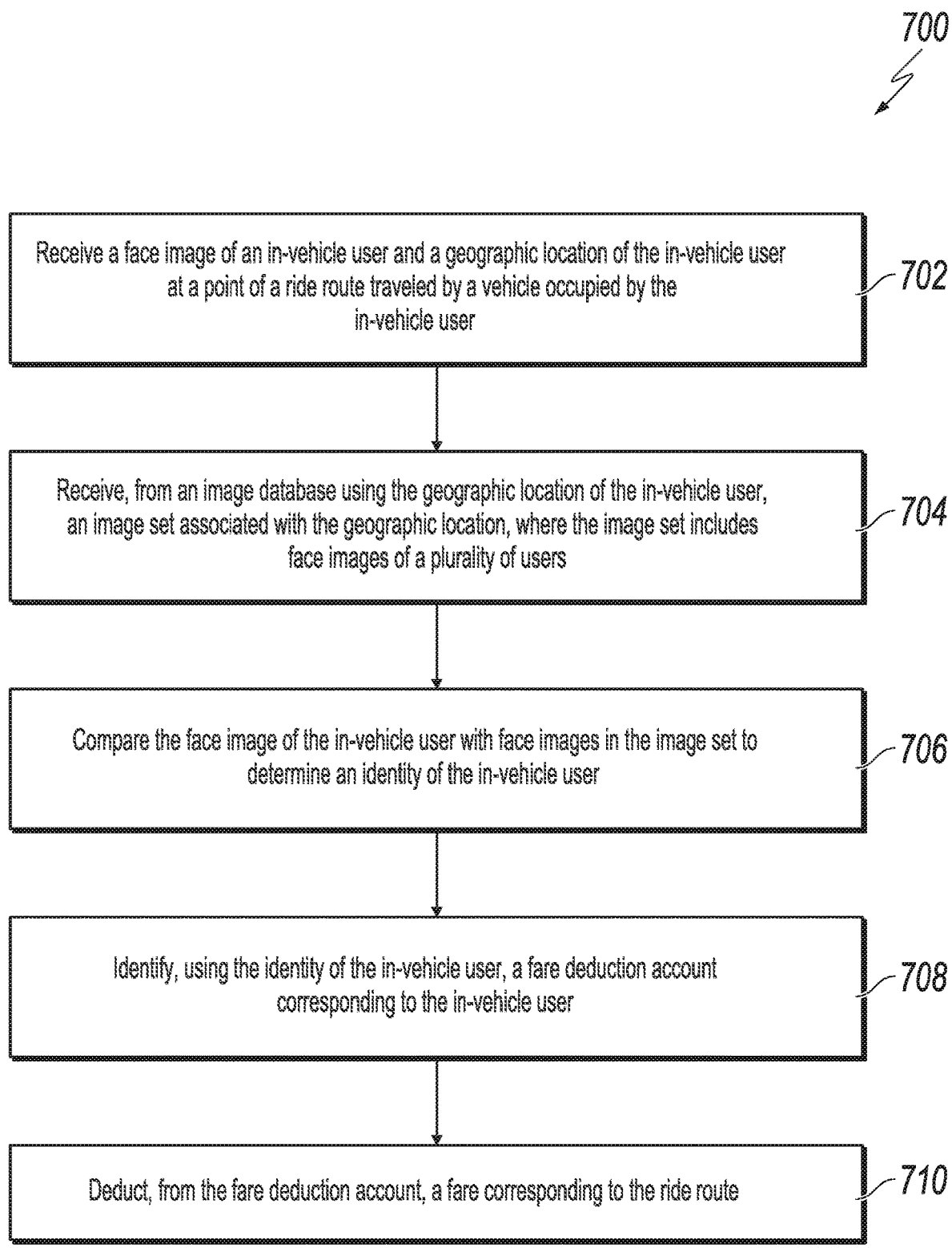
FIG. 7 is a flowchart illustrating an example of a computer-implemented method for completing an in-vehicle payment, according to an implementation of the present disclosure.

FIG. 7 is a flowchart illustrating an example of a computer-implemented method 700 for completing an in-vehicle payment, according to an implementation of the present disclosure. For clarity of presentation, the description that follows generally describes method 700 in the context of the other figures in this description. However, it will be understood that method 700 can be performed, for example, by any system, environment, software, and hardware, or a combination of systems, environments, software, and hardware, as appropriate. In some implementations, various steps of method 700 can be run in parallel, in combination, in loops, or in any order.

At 702, a face image of an in-vehicle user and a geographic location of the in-vehicle user are received at a point of a ride route traveled by a vehicle occupied by the in-vehicle user. For example, the image collection device 12 can obtain the face image of the in-vehicle user while the in-vehicle user is taking a taxi ride in the taxi 11. The image collection device 12 can also obtain the geographic location of the in-vehicle user. The image collection device 12 can be part of a smart terminal device of the in-vehicle user, for example, the smartphone 31, which can be the user's mobile phone or a mobile phone provided by the driver of the taxi.

In some implementations, receiving the geographic location of the in-vehicle user can include receiving the geographic location collected by an application (app) including client software when the in-vehicle user is in the vehicle, where the app executes on a smart terminal device inside the vehicle occupied by the in-vehicle user. For example, an app used for in-vehicle payments can be installed on the smartphone 31, which can be mounted on a base in the taxi. The app can collect the geographic location of the in-vehicle user at any point of the ride route.

In some implementations, receiving the geographic location of the in-vehicle user at the point of the ride route can include determining the geographic location of the in-vehicle user based on a location of a network access point connected to a smart terminal device of the in-vehicle user, where the location of the network access point is within a predetermined range of the point of the ride route. For example, network access points using Bluetooth and Wi-Fi technology can exist at or near places where the in-vehicle user gets on and off the taxi 11. The user's (or driver's) smart terminal device can connect to these network access points. The smart terminal device or the network access points can report connection information to the server. Based on the locations of the network access points connected to the smart terminal device, the server can assist the app in locating the in-vehicle user to determine the geographic location of the in-vehicle user when the in-vehicle user uses the taxi 11. From 702, method 700 proceeds to 704.

At 704, an image set associated with the geographic location is received from an image database using the geographic location of the in-vehicle user, where the image set includes face images of a plurality of users. For example, the image acquisition module 52 can obtain an image set associated with the geographic location from an image database accessible through the server 13 based on the geographic location, where the image set includes face images of a plurality of users. The image set can include face images of users, for example, who often use vehicles in the area of the geographic location. From 704, method 700 proceeds to 706.

At 706, the face image of the in-vehicle user is compared with face images in the image set to determine an identity of the in-vehicle user. For example, the identity recognition module 53 can compare the face image of the in-vehicle user with each face image in the image set to identify the in-vehicle user's identity. From 706, method 700 proceeds to 708.

At 708, a fare deduction account corresponding to the in-vehicle user is identified using the identity of the in-vehicle user. As an example, the identity recognition module 53 can use the identity of the in-vehicle user to identify the fare deduction account corresponding to the in-vehicle user. From 708, method 700 proceeds to 710.

At 710, a fare corresponding to the ride route is deducted from the fare deduction account. For example, the fare deduction module 54 can deduct the fare of the present ride from the fare deduction account of the in-vehicle user. In some implementations, the in-vehicle user can provide a confirmation of the payment using biometrics, for example, eye features, a voiceprint, a fingerprint, a palm print, a heartbeat or pulse, a deoxyribonucleic acid (DNA) sample, or bite marks. After 710, method 700 can stop.

In some implementations, method 700 can further include the presentation of advertisements to the in-vehicle user. For example, a user attribute feature of the in-vehicle user can be determined based on the face image of the in-vehicle user. An advertisement relevant to the user attribute feature can be pushed to the app for presentation to the in-vehicle user. The user attribute feature can be gender and age, for example, and the advertisement that is selected for presentation can be selected based on the in-vehicle user's gender and age.

In some implementations, method 700 can further include storing the geographic location in association with the face image of the in-vehicle user. For example, a database accessible by the server 13 can store coordinates of an area frequented by the user, or a point and radius identifying an area.

In some implementations, method 700 can further include the presentation of entertainment to the in-vehicle user. For example, entertainment can be provided for presentation to the in-vehicle user. The advertisement can be pushed to the app, where the advertisement can be superimposed onto the entertainment.

The present disclosure describes techniques for completing in-vehicle payment, such as by riders of a taxi. For example, face recognition can be performed on the in-vehicle user to obtain the user's identity and automatically deduct the fare. The user's identity can be determined, for example, by comparing the face image of the user to images in database, including users known to take rides in the same geographic area. The techniques can make in-vehicle payments more convenient for users traveling by fare-based vehicles. An advantage is the ability to deduct a fare for a ride from the user's account even if the user does not bring a mobile phone or wallet.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals)

to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for in-vehicle payment, comprising:
   receiving, using a smart terminal device, a face image of a user and a geographic location of the user;
   transmitting, from the smart terminal device to an image database, a request for an image set associated with the geographic location, wherein the request comprises one or more coordinates that correspond to the geographic location;
   receiving, on the smart terminal device from the image database in response to the request, an image set associated with the one or more coordinates that correspond to the geographic location, wherein the image set comprises face images of a plurality of users; and
   comparing, using the smart terminal device, the face image of the user with face images in the image set to determine an identity of the user.

2. The computer-implemented method of claim 1, wherein receiving the geographic location of the user comprises:
   receiving the geographic location collected by an application when the user is in a vehicle, wherein the application executes on the smart terminal device inside the vehicle occupied by the user.

3. The computer-implemented method of claim 2, further comprising:
   determining a user attribute feature of the user based on the face image of the user; and
   pushing an advertisement relevant to the user attribute feature to the application for presentation to the user.

4. The computer-implemented method of claim 3, wherein the user attribute feature comprises one or more of a gender or an age.

5. The computer-implemented method of claim 3, further comprising:
   providing, for presentation to the user, entertainment, wherein pushing the advertisement to the application comprises superimposing the advertisement onto the entertainment.

6. The computer-implemented method of claim 1, wherein receiving the geographic location of the user comprises:
   determining the geographic location of the user based on a location of a network access point connected to the smart terminal device of the user, wherein the location of the network access point is within a predetermined range of an endpoint of a ride route of the user.

7. The computer-implemented method of claim 1, further comprising:
   associating the geographic location with the face image of the user; and storing the geographic location and the face image of the user.

8. A non-transitory, computer-readable storage medium storing one or more instructions executable by a computer system to perform operations for embedding copyright information in digital content, the operations comprising:
receiving, using a smart terminal device, a face image of a user and a geographic location of the user;
transmitting, from the smart terminal device to an image database, a request for an image set associated with the geographic location, wherein the request comprises one or more coordinates that correspond to the geographic location;
receiving, on the smart terminal device from the image database in response to the request, an image set associated with the one or more coordinates that correspond to the geographic location, wherein the image set comprises face images of a plurality of users; and
comparing, using the smart terminal device, the face image of the user with face images in the image set to determine an identity of the user.

9. The non-transitory, computer-readable storage medium of claim 8, wherein receiving the geographic location of the user comprises:
receiving the geographic location collected by an application when the user is in a vehicle, wherein the application executes on the smart terminal device inside the vehicle occupied by the user.

10. The non-transitory, computer-readable storage medium of claim 9, the operations further comprising:
determining a user attribute feature of the user based on the face image of the user; and
pushing an advertisement relevant to the user attribute feature to the application for presentation to the user.

11. The non-transitory, computer-readable storage medium of claim 10, wherein the user attribute feature comprises one or more of a gender or an age.

12. The non-transitory, computer-readable storage medium of claim 10, the operations further comprising:
providing, for presentation to the user, entertainment, wherein pushing the advertisement to the application comprises superimposing the advertisement onto the entertainment.

13. The non-transitory, computer-readable storage medium of claim 8, wherein receiving the geographic location of the user comprises:
determining the geographic location of the user based on a location of a network access point connected to the smart terminal device of the user, wherein the location of the network access point is within a predetermined range of an endpoint of a ride route of the user.

14. The non-transitory, computer-readable storage medium of claim 8, the operations further comprising:
associating the geographic location with the face image of the user; and
storing the geographic location and the face image of the user.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations for embedding copyright information in digital content, the operations comprising:
receiving, using a smart terminal device, a face image of a user and a geographic location of the user;
transmitting, from the smart terminal device to an image database, a request for an image set associated with the geographic location, wherein the request comprises one or more coordinates that correspond to the geographic location;
receiving, on the smart terminal device from the image database in response to the request, an image set associated with the one or more coordinates that correspond to the geographic location, wherein the image set comprises face images of a plurality of users; and
comparing, using the smart terminal device, the face image of the user with face images in the image set to determine an identity of the user.

16. The computer-implemented system of claim 15, wherein receiving the geographic location of the user comprises:
receiving the geographic location collected by an application when the user is in a vehicle, wherein the application executes on the smart terminal device inside the vehicle occupied by the user.

17. The computer-implemented system of claim 16, the operations further comprising:
determining a user attribute feature of the user based on the face image of the user; and
pushing an advertisement relevant to the user attribute feature to the application for presentation to the user.

18. The computer-implemented system of claim 17, wherein the user attribute feature comprises one or more of a gender or an age.

19. The computer-implemented system of claim 17, the operations further comprising:
providing, for presentation to the user, entertainment, wherein pushing the advertisement to the application comprises superimposing the advertisement onto the entertainment.

20. The computer-implemented system of claim 15, wherein receiving the geographic location of the user comprises:
determining the geographic location of the user based on a location of a network access point connected to the smart terminal device of the user, wherein the location of the network access point is within a predetermined range of an endpoint of a ride route of the user.

* * * * *